(12) United States Patent
Oude Vrielink et al.

(10) Patent No.: US 10,533,547 B2
(45) Date of Patent: Jan. 14, 2020

(54) PERISTALTIC PUMP

(71) Applicant: Watson-Marlow Bredel B.V., Delden (NL)

(72) Inventors: Ronald Oude Vrielink, Delden (NL); Fokke Patrick Van Der Span, Hengelo (NL); Jonathan Adrianus Littooij, Borne (NL)

(73) Assignee: Watson-Marlow Bredel B.V., Delden (NL)

( * ) Notice: Subject to any disclaimer, the term of this patent is extended or adjusted under 35 U.S.C. 154(b) by 80 days.

(21) Appl. No.: 15/537,590

(22) PCT Filed: Dec. 17, 2015

(86) PCT No.: PCT/EP2015/080304
§ 371 (c)(1),
(2) Date: Jun. 19, 2017

(87) PCT Pub. No.: WO2016/097188
PCT Pub. Date: Jun. 23, 2016

(65) Prior Publication Data
US 2018/0266410 A1    Sep. 20, 2018

(30) Foreign Application Priority Data

Dec. 17, 2014 (GB) .................................. 1422453.9

(51) Int. Cl.
*F04B 43/12* (2006.01)
*F16C 19/06* (2006.01)

(52) U.S. Cl.
CPC .......... *F04B 43/1261* (2013.01); *F16C 19/06* (2013.01); *F16C 2360/00* (2013.01)

(58) Field of Classification Search
CPC .. F04B 43/1261; F04B 43/12; F04B 43/1253; F04B 45/08; F16C 19/06; F16C 2360/00
See application file for complete search history.

(56) References Cited

U.S. PATENT DOCUMENTS 2,443,688 A * 6/1948 McFarland ............. F01D 5/025
403/29
3,700,361 A   10/1972 De Vries
(Continued)

FOREIGN PATENT DOCUMENTS

EP        026704 A1    4/1981
EP        0881389 A2   12/1998
(Continued)

OTHER PUBLICATIONS

Chinese Office Action for Chinese Application No. 2015800760905 dated Jul. 4, 2018 with english translation.
Office Action for South Korean Application No. 10-2017-7019656 dated Sep. 18, 2018 along with English translation.
International Search Report for Application PCT/EP2015/080304 dated Mar. 16, 2016.
(Continued)

*Primary Examiner* — Charles G Freay
(74) *Attorney, Agent, or Firm* — Honigman LLP

(57) ABSTRACT

A peristaltic pump comprising: a housing having a hub; a rotor disposed within the housing and rotatably supported by the hub, the rotor comprising a drive shaft which extends through the hub, the drive shaft configured to engage with an output shaft of a drive unit to form a drive connection; wherein a first misalignment pivot is formed between the rotor and the hub and a second misalignment pivot is formed between the drive shaft and the output shaft of the drive unit.

8 Claims, 3 Drawing Sheets

(56) References Cited

U.S. PATENT DOCUMENTS

| | | | |
|---|---|---|---|
| 4,548,553 A | 10/1985 | Ferster | |
| 5,746,585 A * | 5/1998 | McDunn | F04B 43/1261 |
| | | | 417/477.1 |
| 6,120,263 A * | 9/2000 | Kosters | F04B 43/1253 |
| | | | 417/477.1 |

FOREIGN PATENT DOCUMENTS

| | | | |
|---|---|---|---|
| GB | 2495935 A | 5/2013 | |
| JP | H10331770 A | 12/1998 | |
| JP | 3108848 U | 4/2005 | |
| JP | 2014530994 A | 11/2014 | |
| RU | 2221934 C2 | 1/2004 | |
| SU | 328260 A1 | 2/1972 | |

OTHER PUBLICATIONS

Office Action from Russian Patent Office for Application No. 2017124638 dated Jun. 21, 2018 with English translation.

Office Action from Japanese Patent Office for Application 2017-533203 dated Jun. 26, 2018.

Notice of Final Rejection for South Korean patent application No. 10-2017-7019656 dated Feb. 26, 2019, along with English translation.

Pre-Appeal Report for Japanese Patent Application No. 2017-533203 dated Sep. 13, 2019, along with English translation.

European Examination Report for Application No. 15810736.7 dated Oct. 16, 2019.

* cited by examiner

PERISTALTIC PUMP

BACKGROUND

The invention relates to a peristaltic pump.

Peristaltic pumps generally comprise a drive motor connected via a gearbox to drive a rotor housed in a pumphead. The rotor carries a pair of shoes or other means for engagement with a flexible tube. As the rotor rotates, the shoes deform the flexible tube to form an occlusion in the tube. As the occlusion moves along the length of the tube, fluid in the tube is forced from one end to the other.

Conventional pumps can generally be classified as either long-coupled or close-coupled pumps.

In a long-coupled pump, the drive unit is coupled to the pumphead via a coupling. Any misalignment (both angle and position) between the drive unit and the pumphead can be corrected via the coupling. However, this process is time consuming and thus costly. The coupling itself is also expensive.

With close-coupled pumps, the rotor is connected directly to the drive unit thereby eliminating the need for a coupling and the associated alignment process. However, with such a design, the drive unit itself must handle the large force exerted on the rotor while compressing the tube.

To avoid the issues associated with close-coupled pumps, the Applicant invented (see EP0881389) a direct-coupled pump in which the pumphead connects directly to the drive unit and the rotor is supported by its own hub, thereby isolating and protecting the drive unit from the forces exerted on the rotor. This allows the drive unit to use a smaller and less expensive gearbox. However, with such a direct-coupled pump, the orientation of the rotor is fixed with respect to the hub which does not allow for any angular misalignment between the components which may result from manufacturing tolerances.

It is therefore desired to provide a pump which addresses the issues of conventional direct-drive pumps and provides greater tolerance of misalignments.

BRIEF SUMMARY

In accordance with an aspect of the invention there is provided a peristaltic pump comprising: a housing having a hub; a rotor disposed within the housing and rotatably supported by the hub, the rotor comprising a drive shaft which extends through the hub, the drive shaft configured to engage with an output shaft of a drive unit to form a drive connection; wherein a first misalignment pivot is formed between the rotor and the hub and a second misalignment pivot is formed between the drive shaft and the output shaft of the drive unit.

A bearing may be disposed between the rotor and the hub at a single axial position to rotatably support the rotor, the bearing forming the first misalignment pivot.

The bearing may comprise a single bearing unit.

The bearing unit may be provided between an outer surface of the drive shaft and an inner surface of the hub.

The drive shaft may comprise a female receiving portion for receiving the output shaft of the drive unit, the second misalignment pivot being formed by the female receiving portion.

The peristaltic pump may further comprise a sleeve which is configured to receive and engage with the output shaft of the drive unit, the sleeve engaging with the female receiving portion to form the drive connection.

The drive shaft may comprise a male portion configured to be received by the output shaft of the drive unit, the second misalignment pivot being formed by the male portion.

The drive connection may comprise complementary interlocking features.

The complementary interlocking features may comprise splines or polygonal shaped features.

The peristaltic pump may further comprise the drive unit.

The drive unit may comprise a motor and a gearbox, wherein the output shaft extends from the gearbox.

The gearbox may be a helical gearbox. The helical gearbox may have a keyed output shaft.

BRIEF DESCRIPTION OF THE DRAWINGS

For a better understanding of the invention, and to show more clearly how it may be carried into effect, reference will now be made, by way of example, to the accompanying drawings, in which.

DETAILED DESCRIPTION

Figure 1:
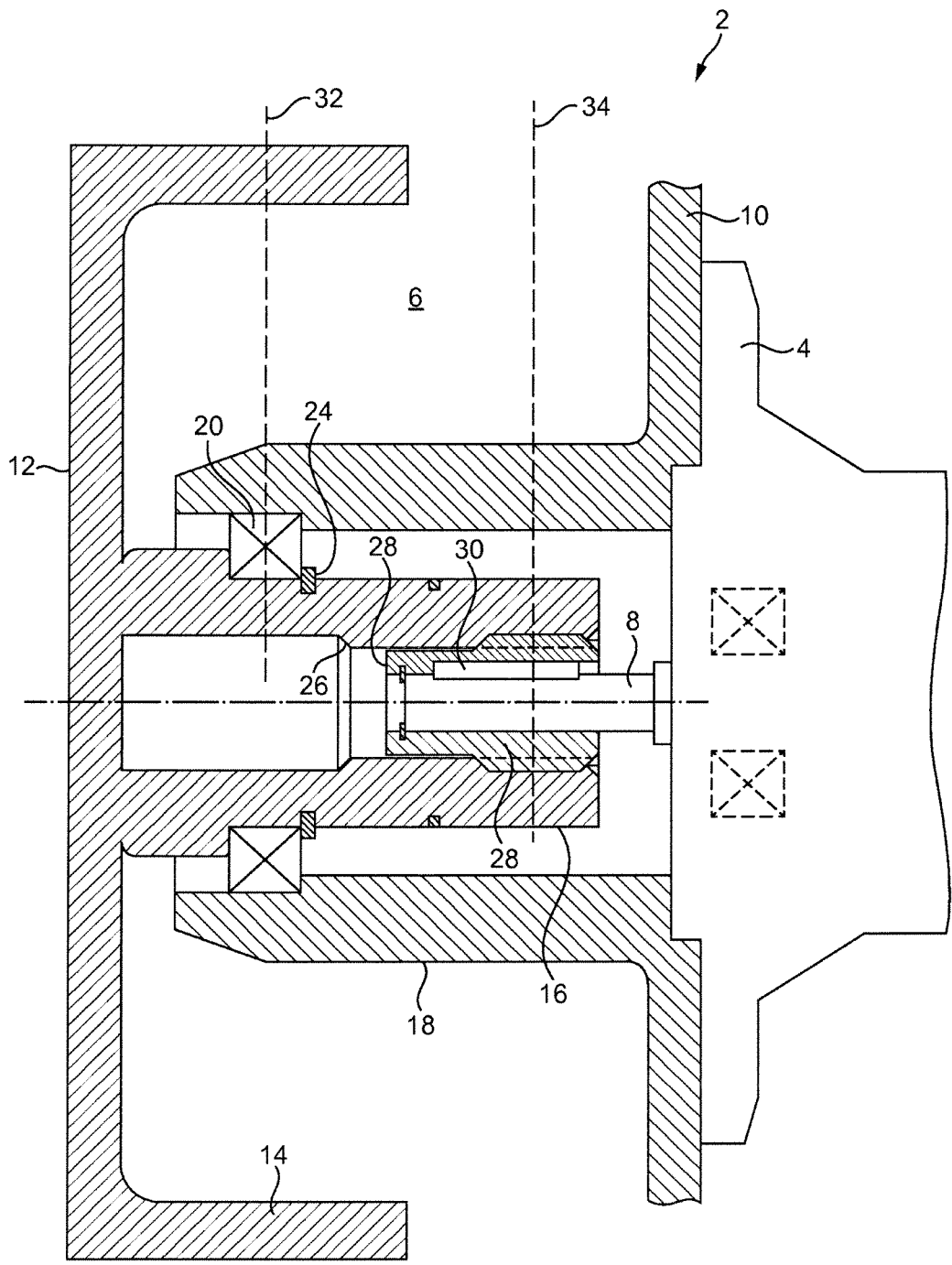
FIG. 1 is a cross-section through a peristaltic pump according to an embodiment of the invention.
Figure 2:
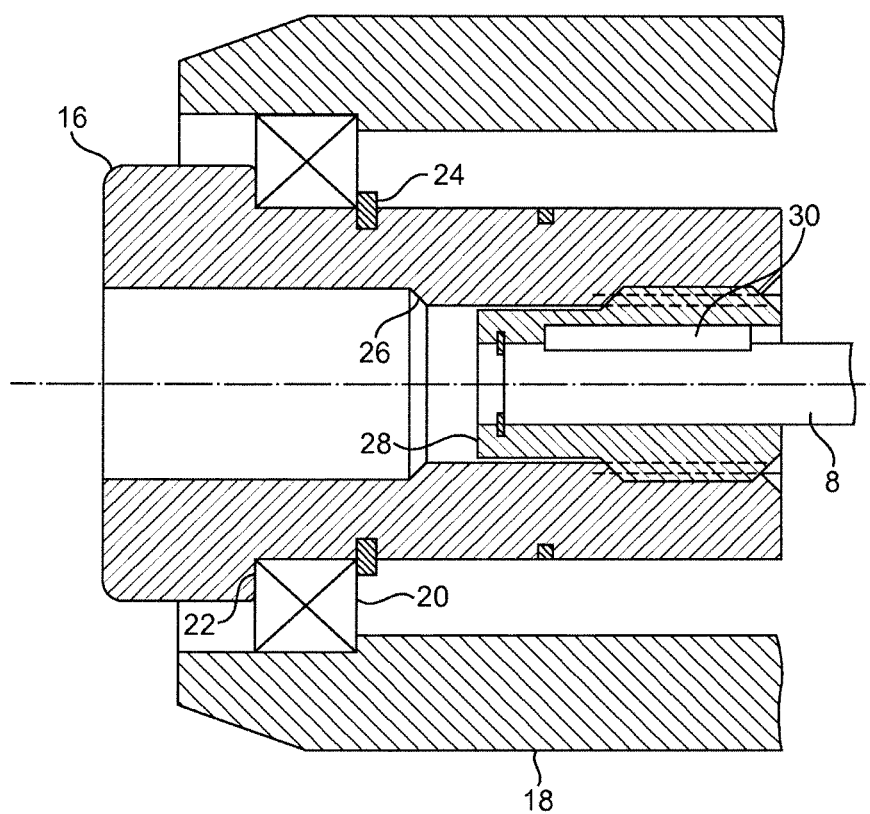
FIG. 2 is an enlarged view of an interconnection between a rotor and a drive unit of the peristaltic pump.

FIGS. 1 and 2 show a peristaltic pump 2 according to an embodiment of the invention. The peristaltic pump 2 comprises a drive unit 4 and a pumphead 6. The drive unit 4 comprises a motor which provides drive via an output shaft 8 of a gearbox, such as a helical gearbox.

The pumphead 6 comprises a housing 10 which is affixed to the drive unit 4. A rotor 12 is disposed within the housing 10. The rotor 12 comprises an outer rim 14 having a pair of shoes (not shown) for engagement with a flexible tube or hose (not shown) disposed between the outer rim 14 of the rotor 12 and an outer wall (not shown) of the housing 10. As the rotor 12 rotates, the shoes deform the flexible tube to form an occlusion in the tube. As the occlusion moves along the length of the tube, fluid in the tube is forced from one end to the other. A lubricating fluid may be provided within the housing to reduce friction between the shoes and the tube and thus to reduce wear. Accordingly, the housing 10 may form a sealed unit to prevent leakage of the lubricating fluid.

A drive shaft 16 extends from the center of the rotor 12. The drive shaft 16 is received within a hub 18 of the housing 10. The hub 18 has a hollow, cylindrical form and projects away from the drive unit 4 with the output shaft 8 of the drive unit 4 located at its center. The rotor 12 is rotatably mounted to the drive unit 4 via the hub 18 of the housing 10. Specifically, a single (i.e. only one) bearing unit 20 is disposed between an outer surface of the drive shaft 16 and an inner surface of the hub 18. The bearing unit 20 may be a conventional rolling-element bearing, such as a ball bearing or a roller bearing. It may be useful to utilize a spherical roller bearing to permit angular misalignment, as described further below. The bearing unit 20 thus allows the rotor 12 to rotate relative to the housing 10.

The bearing unit 20 is received over a distal end of the drive shaft 16 and abuts against a shoulder 22 formed on the drive shaft 16. The bearing unit 20 is retained on the drive shaft 16 by a circlip 24 (or snap ring) which is located in a groove formed around the circumference of the drive shaft 16. The axial position of the bearing unit 20 along the drive shaft 16 is thus fixed by the shoulder 22 and the circlip 24.

The drive shaft 16 is hollow and is provided with a splined female receiving portion 26. A converter sleeve 28 is attached to the output shaft 8 of the drive unit 4. The converter sleeve 28 has an inner surface which is provided with a keyway which engages with a key 30 received in a keyseat extending along the length of the output shaft 8. The key 30 thus connects the converter sleeve 28 to the output shaft 8 so as to prevent relative rotation therebetweeen. An outer surface of the converter sleeve 28 is provided with splines which correspond to those of the female receiving portion 26. The converter sleeve 28 is therefore received by the female receiving portion 26 of the drive shaft 16 and transmits torque from the output shaft 8 to the rotor 12.

The splines provided on the converter sleeve 28 may be shorter in length than those of the female receiving portion 26. Consequently, the splines of the converter sleeve 28 may be allowed to translate relative to those of the female receiving portion 26, thereby allowing the axial position of the drive shaft 16 relative to the output shaft 8 to be varied.

The bearing unit 20 forms a first misalignment pivot (denoted by line 32) between the rotor 12 and the housing 10. The first misalignment pivot allows a small amount of angular misalignment between the drive shaft 16 and the hub 18 (i.e. where the axis of rotation of the drive shaft 16 is angled relative to the axial direction defined by the hub 18).

Similarly, the splined drive connection formed by the converter sleeve 28 and the female receiving portion 26 forms a second misalignment pivot (denoted by line 34) between the rotor 12 and the drive unit 4. The second misalignment pivot allows a small amount of angular misalignment between the drive shaft 16 and the output shaft 8 (i.e. where the axis of rotation of the drive shaft 16 is angled relative to the axis of rotation of the output shaft 8).

The first and second misalignment pivots thus allow for misalignment between the drive unit 4 and the pumphead 6 which may result from normal manufacturing tolerances.

Figure 3:
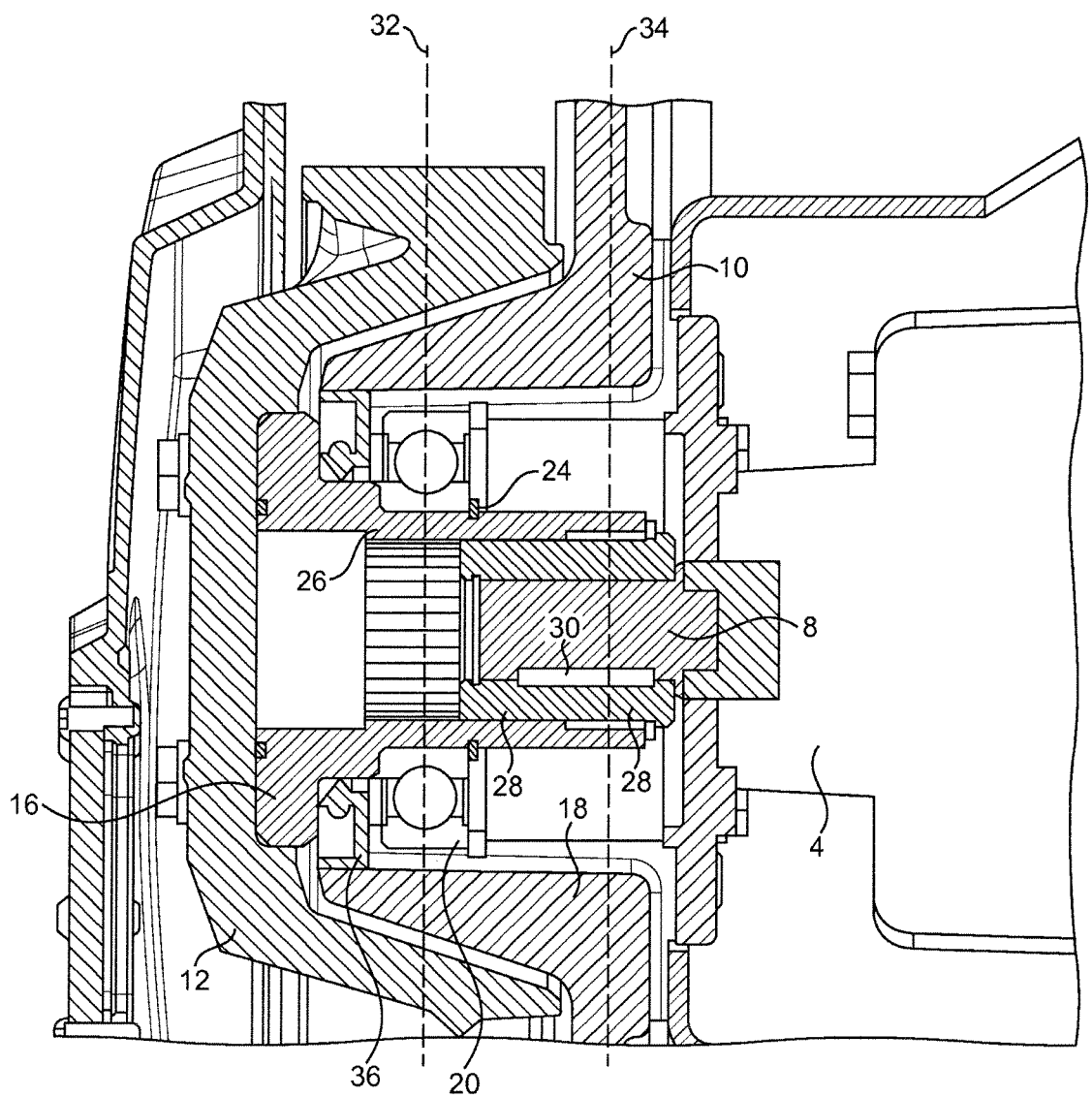
FIG. 3 is a cross-section through a peristaltic pump according to another embodiment of the invention.

FIG. 3 shows another embodiment of the invention. This embodiment differs from the embodiment described previously only in that a seal 36 is provided outboard of the bearing unit 20. The seal 36 ensures that the lubricating fluid (and, if the tube fails, the pumped fluid) cannot leak from the pumphead 6. The drive unit 4 is therefore fully isolated and thus protected from the pumphead 6. The seal 36 could alternatively or in addition be provided inboard of the bearing unit 20.

In the embodiments described above, the converter sleeve 28 converts the form of the output shaft 8 into a suitable form to mesh with the female receiving portion 26 of the drive shaft 16. A plurality of converter sleeves may therefore be provided in order to convert the output shafts of different drive units into a suitable form for the pumphead 6. The converter sleeves thus allow the pumphead 6 to be driven by various different drive units. It will be appreciated that the converter sleeve 28 may be used simply for size conversion, even when the form of the output shaft 8 corresponds to that of the female receiving portion 26.

Further, the drive connection may be formed directly between the output shaft 8 and the drive shaft 16 without using the converter sleeve 28. The drive connection also need not be splined and may be formed by any other suitable complementary features, such as polygonal shaped features.

Although the hub 18 has been described as being part of the pumphead housing 10, it may instead be formed by the drive unit 4 itself.

Although the invention has been described as using a single bearing unit 20, it will be appreciated that additional bearing units may be used so long as they are aligned at a single axial position (i.e. they are concentric) to form a misalignment pivot. For example, an additional bearing unit may be disposed between the outer surface of the hub 18 and an inner surface of a portion of the rotor 12. Provided the additional bearing unit is disposed along line 32, then the rotor 12 is still allowed to pivot relative to the hub 18.

Where only a single bearing unit is used, this may instead be disposed between the outer surface of the hub 18 and an inner surface of a portion of the rotor 12.

The drive shaft 16 of the rotor 12 need not be hollow along its entire length (i.e. it may be only partially hollow). Indeed, in other embodiments, the drive shaft 16 may form a male portion which is received by a female receiving portion of the drive unit 4 (or an intermediate converter sleeve).

The invention is not limited to the embodiments described herein, and may be modified or adapted without departing from the scope of the present invention.

The invention claimed is:

1. A peristaltic pump comprising:
    a housing having a hub;
    a rotor disposed within the housing and rotatably supported by the hub, the rotor comprising a drive shaft which extends through the hub, the drive shaft configured to engage with an output shaft of a drive unit to form a drive connection;
    wherein a first misalignment pivot is formed between the rotor and the hub and a second misalignment pivot is formed between the drive shaft and the output shaft of the drive unit,
    wherein a bearing is disposed between the rotor and the hub at a single axial position to rotatably support the rotor, the bearing forming the first misalignment pivot,
    wherein the drive shaft includes a female receiving portion for receiving the output shaft of the drive unit, the second misalignment pivot being formed by the female receiving portion,
    a sleeve configured to receive and engage with the output shaft of the drive unit, the sleeve engaging with the female receiving portion to form the drive connection.

2. A peristaltic pump as claimed in claim 1, wherein the bearing comprises a single bearing unit.

3. A peristaltic pump as claimed in claim 2, wherein the bearing unit is provided between an outer surface of the drive shaft and an inner surface of the hub.

4. A peristaltic pump as claimed in claim 1, wherein the drive connection comprises complementary interlocking features.

5. A peristaltic pump as claimed in claim 4, wherein the complementary interlocking features comprise splines or polygonal shaped features.

6. A peristaltic pump as claimed in claim 1, further comprising the drive unit.

7. A peristaltic pump as claimed in claim 6, wherein the drive unit comprises a motor and a gearbox, wherein the output shaft extends from the gearbox.

8. A peristaltic pump as claimed in claim 7, wherein the gearbox is a helical gearbox.

* * * * *